(12) United States Patent
Ishizuka et al.

(10) Patent No.: US 7,711,899 B2
(45) Date of Patent: May 4, 2010

(54) INFORMATION PROCESSING DEVICE AND DATA CONTROL METHOD IN INFORMATION PROCESSING DEVICE

(75) Inventors: Takaharu Ishizuka, Kawasaki (JP); Daisuke Itou, Kawasaki (JP); Takashi Yamamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 358 days.

(21) Appl. No.: 11/169,858

(22) Filed: Jun. 30, 2005

(65) Prior Publication Data

US 2006/0212652 A1    Sep. 21, 2006

(30) Foreign Application Priority Data

Mar. 17, 2005    (JP)    ............... 2005-076590

(51) Int. Cl.
*G06F 12/00*    (2006.01)
*G06F 13/00*    (2006.01)
*G06F 13/28*    (2006.01)

(52) U.S. Cl. .................................................. 711/119
(58) Field of Classification Search ................. 711/119
See application file for complete search history.

(56) References Cited

U.S. PATENT DOCUMENTS

| | | | | |
|---|---|---|---|---|
| 6,438,660 | B1 * | 8/2002 | Reams | 711/143 |
| 6,587,922 | B2 * | 7/2003 | Higuchi et al. | 711/121 |
| 6,615,322 | B2 * | 9/2003 | Arimilli et al. | 711/145 |
| 6,775,748 | B2 * | 8/2004 | Jamil et al. | 711/145 |
| 2003/0005227 | A1 | 1/2003 | Yamazaki | |
| 2003/0167385 | A1 * | 9/2003 | Lai et al. | 711/167 |
| 2004/0068616 | A1 | 4/2004 | Tierney et al. | |

FOREIGN PATENT DOCUMENTS

| | | |
|---|---|---|
| JP | 3-288245 | 12/1991 |
| JP | 03-288245 | 12/1991 |
| JP | 6-301600 | 10/1994 |
| JP | 06-301600 | 10/1994 |
| JP | 07-115196 | 5/1995 |

OTHER PUBLICATIONS

Korean Office Action dated Jun. 20, 2005, for Korean App. No. 2000-7002649 (and English translation of Reasons of Rejection thereof).

European Search Report issued in corresponding European Patent Application No. 05254128.1 on Apr. 24, 2008.

* cited by examiner

*Primary Examiner*—Sheng-Jen Tsai (57) ABSTRACT

An information processing device of a multiprocessor configuration that can increase significantly the processing capability of read requests. The information processing device comprises a plurality of processing units, a plurality of cache memories for storing temporarily the data read by the plurality of processing units from respective main memories in combination with tag information indicating the state of the data that will be stored, and a system controller for controlling the access of the plurality of processing units to the main memories. The system controller comprises a tag copy unit for holding a copy of the tag information that will be stored in the cache memory, a plurality of write cues for storing write requests, and a store buffer for storing the arbitration results relating to a plurality of write requests that will be stored in the plurality of write cues.

13 Claims, 6 Drawing Sheets

INFORMATION PROCESSING DEVICE AND DATA CONTROL METHOD IN INFORMATION PROCESSING DEVICE

BACKGROUND OF THE INVENTION

1. Field of the Invention

The present invention relates to an information processing device comprising a plurality of processing units and a data control method in the information processing device.

2. Description of the Related Art

Information processing devices such as servers have been widely used in recent years in a variety of fields. Web servers processing millions of accesses per day and transaction servers used in financial institutions or communication companies are the typical servers.

Because such information processing devices are required to have a high processing capability, they most often have a multiprocessor configuration carrying a plurality of processing units (CPU (Central Processing Unit), MPU (Micro Processing Unit) etc.) in one information processing device. In the information processing devices with a multiprocessor configuration, control has to be conducted to maintain consistency (memory consistency, cache coherency) of data stored in a main memory and a cache provided in each processing unit so that each processing unit can independently access the main memory.

In the information processing devices with a multiprocessor configuration, the consistency is most often controlled with a system controller conducting intermediate processing of the main memory and each processing unit. Further, as a control for maintaining the consistency, for example, in the case where a read request relating to the same request is generated, while the system controller stores data (write data) that will be written into the main memory, the system controller waits till writing of the write data into the main memory is completed and then processes the read request.

As a result, the execution time required for processing the read requests is increased and the processing capability of the information processing device is degraded. Accordingly, a technology for improving the processing capability of read requests in an information processing device by using a store buffer for storing temporarily the data immediately prior to writing to the main memory or cache memory has been suggested as prior art technology (Japanese Patent Application Laid-open No. H6-301600 and H3-288245).

However, data stored in the store buffer is stored as a result of arbitration relating to read requests and write requests from each processing unit that are stored in a read cue or write cue provided in the previous stage. Therefore, the problem is that it is necessary to wait for arbitration in order to use the store buffer (and data stored therein).

SUMMARY OF THE INVENTION

It is an object of the present invention to provide an information processing device of a multiprocessor configuration that can process read requests, without waiting for arbitration relating to the store buffer.

This object can be attained by providing as the first aspect of the present invention an information processing device, comprising a plurality of processing units, a plurality of cache memories corresponding to the plurality of processing units, for storing temporarily the data read by the plurality of processing units from a main memory, and a system controller for controlling the access of the plurality of processing units to the main memories, wherein the system controller comprises a tag copy unit for holding the tag information, of the tag information and data contained in the cache memory, a plurality of write cues corresponding to the plurality of processing units, for storing write requests outputted respectively by the plurality of processing units, and a store buffer for storing the arbitration results relating to a plurality of write requests that will be stored in the plurality of write cues, and the system controller, in the case where the tag information contained in the cache memory and the tag information contained in the tag copy unit are asynchronous when a read request from one processing unit of the plurality of processing units is inputted, searches the plurality of write cues to find whether a write request relating to the address corresponding to the read request has been inputted by another processing unit that is different from the one processing unit and, if such a request has been inputted in any of the plurality of write cues, acknowledges the data contained in the write request relating to the address corresponding to the read request.

With the more preferred embodiment of this aspect of the present invention, the system controller cancels the write request relating to the address corresponding to the read request.

Further, with the more preferred embodiment of this aspect of the present invention, the plurality of processors are divided into a plurality of groups, the system controller is present for each group, the first system controller corresponding to one group of the plurality of groups, in the case where the tag information contained in a cache memory of the first system controller and the tag information contained in a tag copy unit of the first system controller are asynchronous when a read reference request from a second system controller different from the first system controller is inputted, searches the plurality of write cues provided in the first system controller to find whether a write request relating to the address corresponding to the read reference request has been inputted and, if such a request has been inputted in any of the plurality of write cues, acknowledges the data contained in the corresponding write request.

Further, with the more preferred embodiment of this aspect of the present invention, the first system controller cancels the write request relating to the address corresponding to the read request.

With the more preferred embodiment of this aspect of the present invention, the second system controller adds to the write cue of the second system controller a write request for writing data acknowledged in response to the read reference request in the address corresponding to the read reference request.

With the more preferred embodiment of this aspect of the present invention, the system controller, when there follows a separate write request to the address corresponding to any write request contained in the plurality of write cues, cancels the write request that preceded this request.

Further, the aforementioned object can be attained by providing as the second aspect of the present invention a data control method in an information processing device comprising a plurality of processing units, a plurality of cache memories corresponding to the plurality of processing units, for storing temporarily the data read by the plurality of processing units from a main memory in combination with tag information indicating the state of said data that will be stored, and a system controller for controlling the access of the plurality of processing units to the main memory, where the system controller comprises a tag copy unit for holding the tag information, of the tag information and data contained in the cache memory, a plurality of write cues corresponding to the plurality of processing units, for storing write requests outputted respectively by the plurality of processing units, and a store buffer for storing the arbitration results relating to a plurality of write requests that will be stored in the plurality of write cues, wherein the information processing device verifies whether the tag information contained in the cache memory and the tag information contained in the tag copy unit are asynchronous when a read request from one processing unit of a plurality of processing units is inputted, the information processing device, when they are asynchronous, searches the plurality of write cues to find whether a write request relating to the address corresponding to the read request has been inputted by another processing unit that is different from the one processing unit, and the information processing device, if a write request relating to the address corresponding to the read request has been inputted in any of the plurality of write cues, acknowledges the data contained in the write request relating to the address corresponding to the read request.

With the embodiments of the present invention an information processing device of a multiprocessor configuration can be provided that can increase significantly the processing capability of read requests, without waiting for arbitration.

DESCRIPTION OF THE PREFERRED EMBODIMENTS

Embodiments of the present invention will be described below with reference to the appended drawings. However, the technological scope of the present invention is not limited to the below-described embodiments and covers the inventions described in claims and equivalents thereof.

Figure 1:
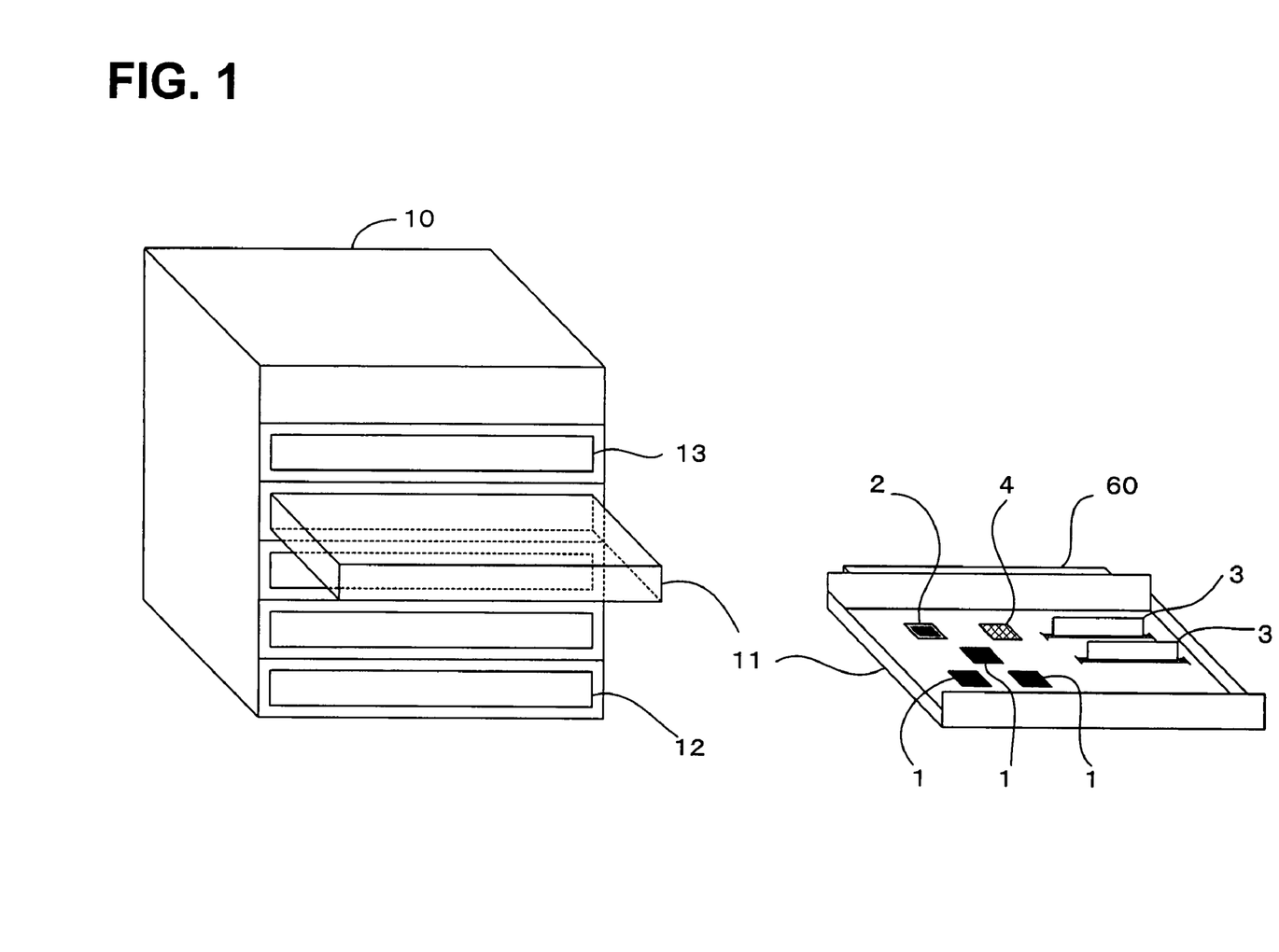
FIG. 1 is a view of a server with a multiprocessor configuration.

FIG. 1 shows a server 10 with a multiprocessor configuration. A plurality of boards that can be accommodated in a tray-like form in a case and can be pulled out therefrom are carried in the server 10 shown in FIG. 1. For example, there is a CPU memory board 11, a disk board 12 carrying a hard disk, and an IO board 13 carrying an interface such as a network interface, a SCSI (Small Computer System Interface), and FC (Fibre Channel). A plurality of boards carried on the server 10 can be connected to each other via a bus called a crossbar and provided inside the case.

The CPU memory board 11 of the present embodiment comprises a plurality of CPU 1, a main memory 3, a system controller 2 for controlling the access from a plurality of CPU 1 to the main memory 3, a crossbar switch 4 for controlling data transfer between the boards, and a connector 60 for connection to the crossbar.

Figure 2:
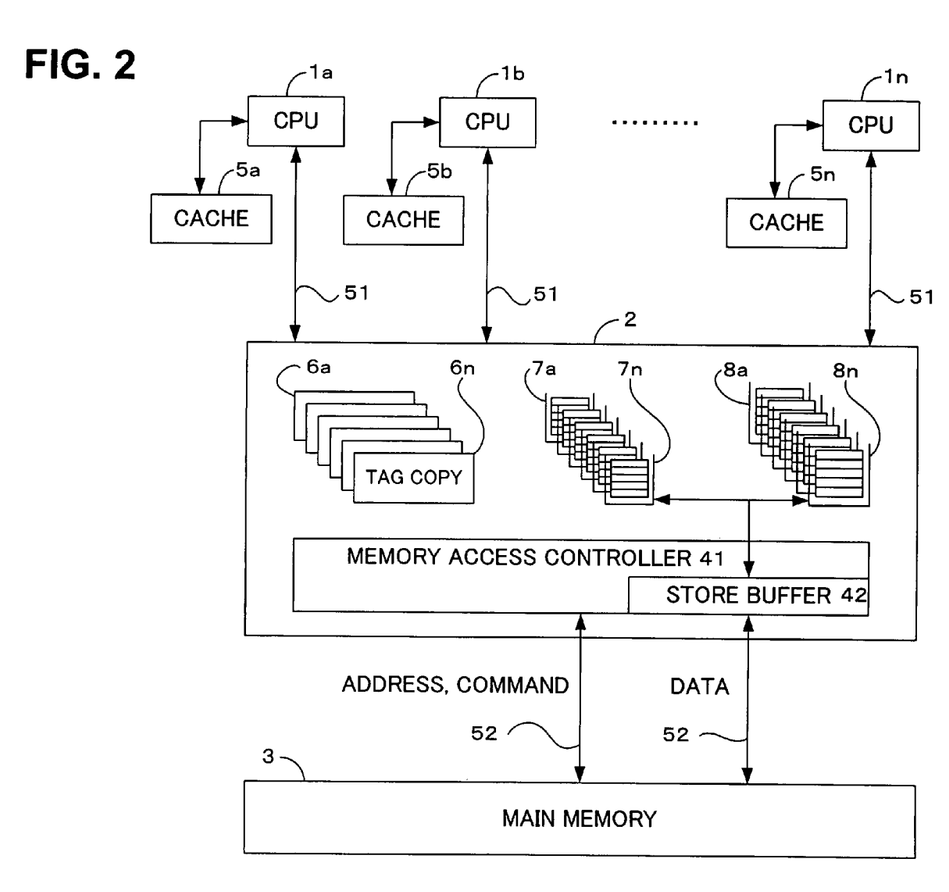
FIG. 2 is a composition block diagram of an information processing device according to an embodiment of the present invention.

FIG. 2 is a structural block diagram of the information processing device of the present embodiment. CPU $1a$-$1n$ are a plurality of processing units, each comprising a cache memory $5a$-$5n$ for temporarily storing data read from the main memory 3.

Figure 3:
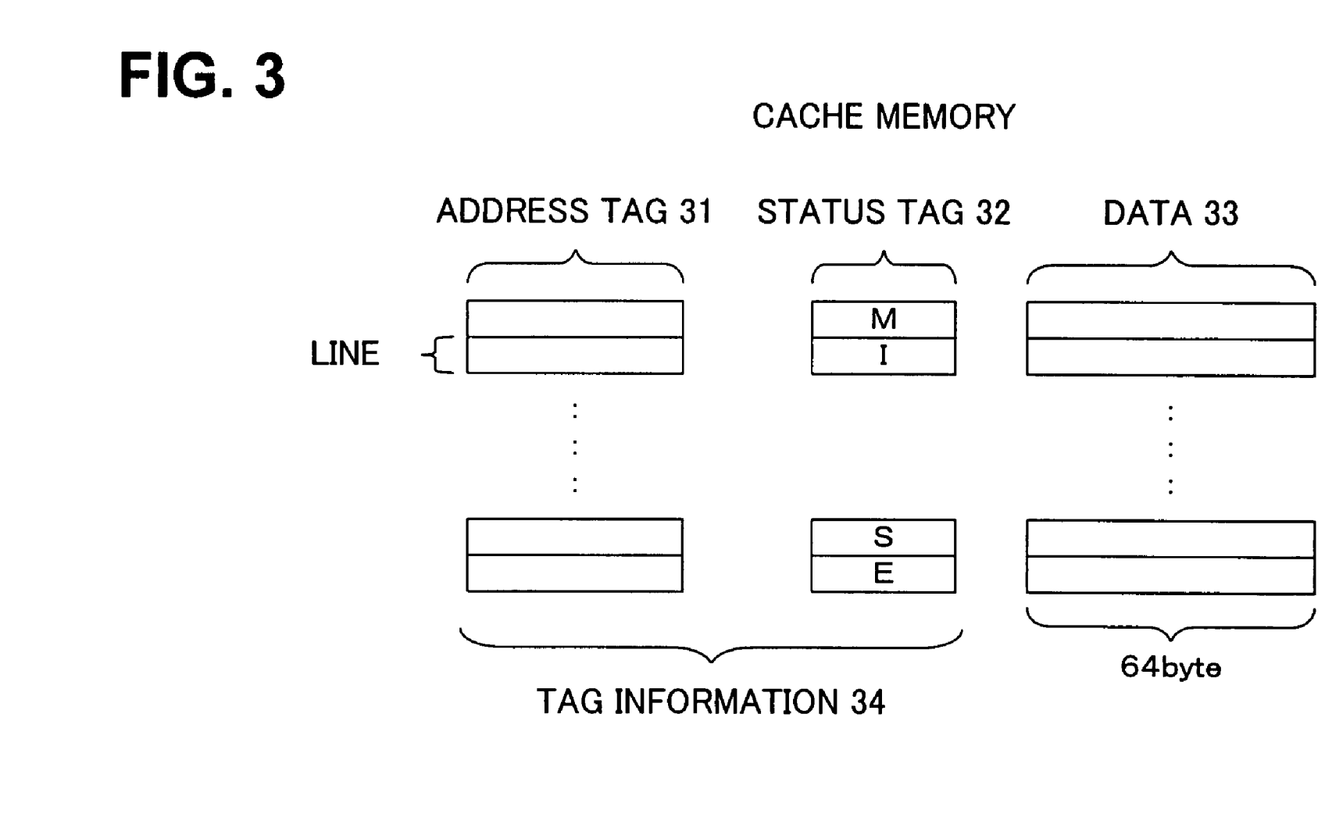
FIG. 3 is a view of data to be stored in cache memories.

FIG. 3 shows data to be stored in the cache memory. A plurality of data of the prescribed length (for example, in FIG. 3, 64 byte) equal to the division size in the main memory 3 are stored as one line in the cache memory. An address tag 31 for mapping to the address in the main memory 3 and a status tag 32 indicating the state of the cache are associated with each line.

For example, direct mapping, fully associated mapping, and set associated mapping are known as mapping methods. The information processing device of the present invention can be implemented regardless of the mapping method.

A MESI (Modified/Exclusive/Shared/Invalid) system for classification by indicators such as "Effective/Ineffective" that indicates whether or not the data is usable, "Common/Exclusive" that indicates whether or not the copy is contained in another cache memory, and "Clean/Dirty" that indicates whether the data has or has not been modified is used for indicating the state of the cache. In the MESI system, "M" means Modified, which is "Effective"+"Exclusive"+"Dirty", "E" means Exclusive, which is "Effective"+"Exclusive"+"Clean", "S" means Shared, which is "Effective"+"Common"+"Clean", and "I" means Invalid, which is "Ineffective".

Returning to FIG. 2, each CPU is connected to the system controller 2 via a CPU bus 51. The system controller 2 comprises tag copies $6a$-$6n$ for storing the copies of the address tag 31 and status tag 32 (referred to hereinbelow as tag information 34). Further, the system controller 2 also comprises a store buffer 42 for storing, correspondingly to a plurality of processing units, read cues $7a$-$7n$ for storing read requests inputted by each processing unit, write cues $8a$-$8n$ for storing write requests inputted by each processing unit, and, for example, data immediately preceding the writing to the main memory 3, as results of arbitration relating to the read request and write request stored in the read cues $7a$-$7n$ and write cues $8a$-$8n$, of the information contained in the cache memory.

A memory access controller 41 comprised in the system controller 2 writes to the main memory 3 the data stored in the store buffer 42 correspondingly to the results of arbitration and stores in the store buffer 42 the data read out from the main memory 3. The system controller 2 thereby controls the access of a plurality of CPU 1 to the main memory 3. Further, the system controller 2 is connected to the main memory 3 via a memory bus 52 and exchanges addresses, commands, and data therewith.

The information processing device of the present embodiment prevents the decrease in processing performance in the case where a read request to the same address is generated, while the system controller 2 holds data to be written into the main memory 3, by referring to the write cues $8a$-$8n$ provided not in the store buffer, but at a stage preceding it. By directly referring to the write cues $8a$-$8n$, the information processing device of the present embodiment can advance the high-speed processing, without waiting for arbitration. The operation example thereof will be described below.

Figure 4:
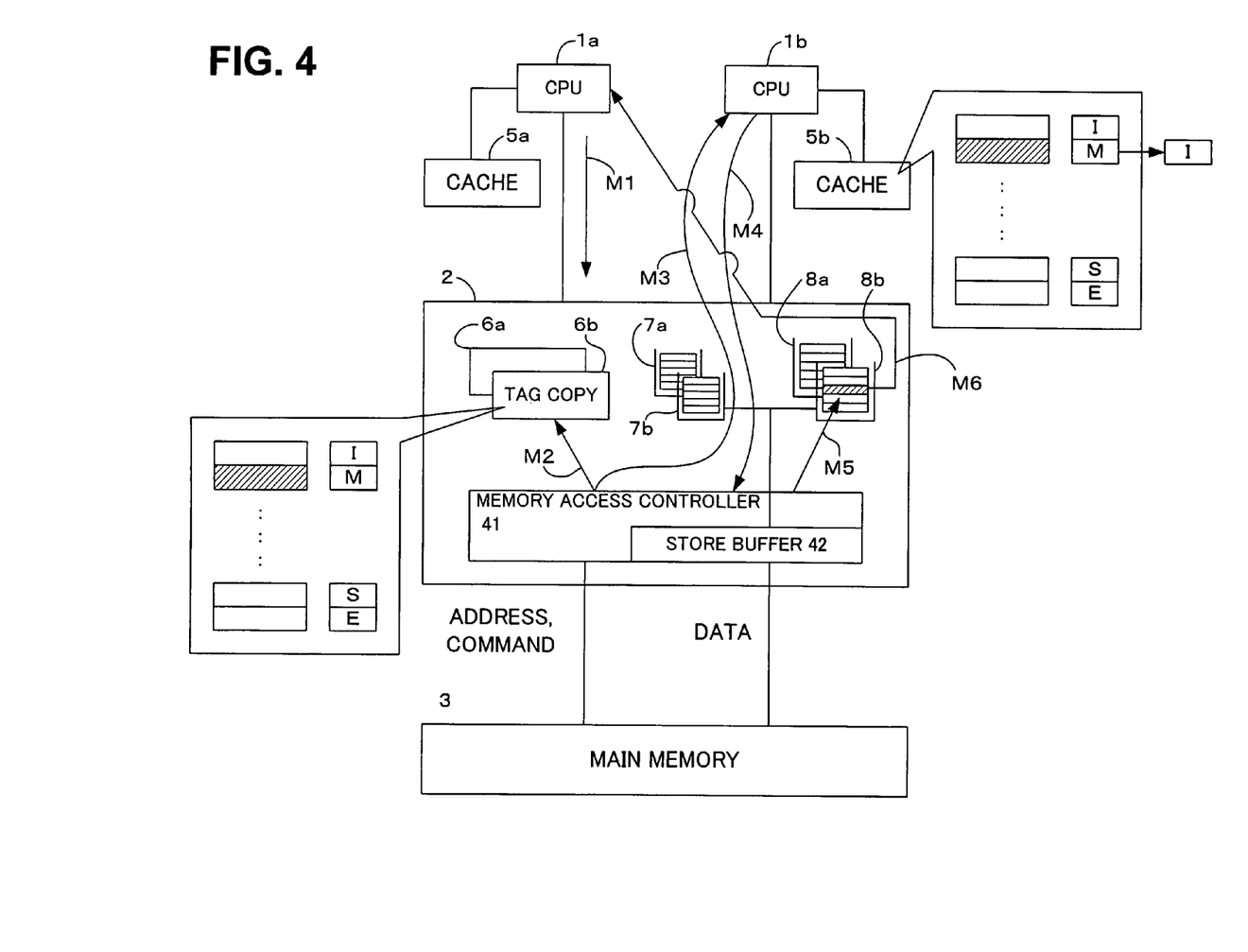
FIG. 4 is a view that explains an operation (No.1) of the information processing device according to an embodiment of the present invention.

FIG. 4 illustrates the operation (first example) of the information processing device of the present embodiment. It is assumed that the status of the second line of the cache memory $5b$ is changed from "M" to "I" because the CPU $1b$ conducted a write request for the data contained in the second line of the cache memory $5b$.

However, in the tag copy $6b$ corresponding to the CPU $1b$, a state is indicated (asynchronous state of the cache $5b$ and tag copy $6b$) that does not reflect this change. The tag copy $6b$, as was explained with reference to FIG. 2, comprises the tag information 34 composed of the address tag 31 and status tag 32, but in FIG. 4, for the purpose of explanation, the data 33 and status tag 32 are plotted as the contents of the tag copy 6b.

Here, a read request relating to the address corresponding to the second line of the cache memory 5b is inputted from the CPU 1a to the system controller 2 (M1). Having received the read request, the memory access controller 41 refers to the tag copies 6a, 6b (M2). As a result, because the tag copy 6b corresponding to the CPU 1b is asynchronous, the address contained in the read request is set in the cache of the CPU 1b, and the memory access controller 41 outputs a data request to the CPU 1b (M3).

However, because the status of the second line is already "I" in the cache memory 5b and there are no usable data, a data absence notification is inputted by the CPU 1b to the system controller 2 (M4). Then, as a specific operation of the information processing device of the present embodiment, the memory access controller 41 refers to the write cue 8b corresponding to the CPU 1b (M5).

Further, a search is conducted for a write request relating to the address corresponding to the second line of the cache memory 5b and the write data contained in the discovered write request is outputted into the CPU 1a (M6). Thus, the data is transmitted from the write cue and the processing performance degradation of the information processing device is prevented, without waiting for the arbitration relating to the store buffer, even when a read request relating to the same address is generated, while the system controller 2 holds the write data to be written into the main memory 3.

Figure 5:
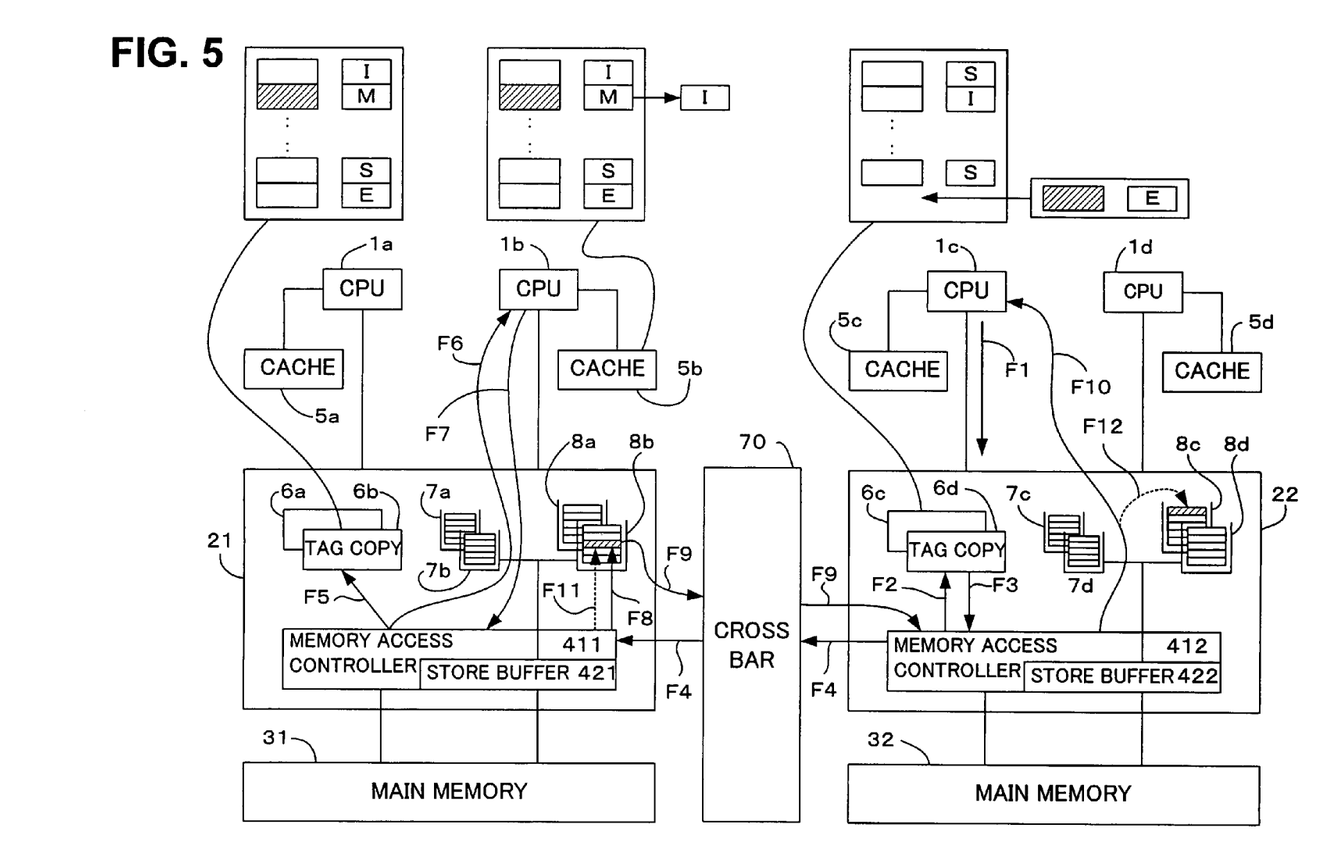
FIG. 5 is a view that explains an operation (No.2) of the information processing device according to an embodiment of the present invention.

FIG. 5 illustrates the operation (second example) of the information processing device of the present embodiment. FIG. 5 illustrates the case where, when two CPU memory boards are connected via a crossbar 70, the operation illustrated by FIG. 4 occurs beyond the CPU memory boards.

Similarly to FIG. 4, it is assumed that the status of the second line of the cache memory 5b is changed from "M" to "I" because the CPU 1b conducted a write request for the data contained in the second line of the cache memory 5b. However, in the tag copy 6b corresponding to the CPU 1b, a state is indicated (asynchronous state of the cache 5b and tag copy 6b) that does not reflect this change. The tag copy 6b, as was explained with reference to FIG. 2, comprises the tag information 34 composed of the address tag 31 and status tag 32, but in FIG. 5, for the purpose of explanation, the data 33 and status tag 32 are plotted as the contents of the tag copy 6b.

Here, a read request relating to the address corresponding to the second line of the cache memory 5b is inputted from the CPU 1c to the system controller 22 (F1). Having received the read request, the memory access controller 412 refers to the tag copies 6c, 6d (F2). The tag copies 6c, 6d have no cache that hits the address contained in the read request and the data absence notification is inputted into the memory access controller 412 (F3).

As a result, the memory access controller 412 transmits a read reference request to the crossbar 70 for reference to the tag copy in another CPU memory board (F4). If the read reference request is received via the crossbar 70, the memory access controller 411 of the system controller 21 refers to the tag copies 6a, 6b (F5).

As a result, because the tag copy 6b corresponding to the CPU 1b is asynchronous, the address contained in the read request inputted from the CPU 1c is set into the cache of the CPU 1b and the memory access controller 411 outputs the data request to the CPU 1b (F6).

However, because the status of the second line is already "I" in the cache memory 5b and there are no usable data, a data absence notification is inputted by the CPU 1b into the system controller 411 (F7). Then, as a specific operation of the information processing device of the present embodiment, the memory access controller 411 refers to the write cue 8b corresponding to the CPU 1b (F8).

Further, the memory access controller 411 searches for a write request relating to the address corresponding to the second line of the cache memory 5b and transmits the write data contained in the discovered write request to the crossbar 70 as a response to the read reference request (F9). If the response to the read reference request is received via the crossbar 70, the memory access controller 412 of the system controller 22 outputs the write data contained in the response to the read reference request to the CPU 1c (F10). Finally, the data contained in the second line of the cache memory 5b is added in the status "E" to the cache memory 5c of the CPU 1c.

Thus, the data is transmitted from the write cue and the processing performance degradation of the information processing device is prevented, without waiting for the arbitration relating to the store buffer, even when a read request relating to the same address is generated beyond the CPU memory board, while the system controller 2 holds the write data to be written into the main memory 3.

In the operation example illustrated by FIG. 5, the following processing can be added. One is the processing of annulling the write request relating to the address corresponding to the second line of the cache memory 5b from the write cue 8b when the memory access controller 411 conducts the processing of step F9 (F11). Another is the processing of generating a write request for writing the write data contained in the response to the read reference request to the main memory 32 of the system controller in any write cue in the system controller 22 when the memory access controller 412 conducts the processing of step F10 (F12)

The effect of annulling (F11) the write request is that the control (memory consistency, cache coherence) for maintaining consistency is facilitated without the presence of a plurality of overlapping write data in a plurality of system controllers 21, 22. In this case, too, the newest data is copied into the cache memory 5c of the CPU 1c and no problems are associated with the control.

Further, due to the generation (F12) of the write request, each time the response to the read reference request is received via the crossbar 70, the newest data is stored in the main memory in the CPU memory board that received it, while maintaining consistency. It can be anticipated that increasing the volume of the main memory for storing the newest data will reduce a load on the processor bus and improve the performance of the information processing device.

Figure 6:
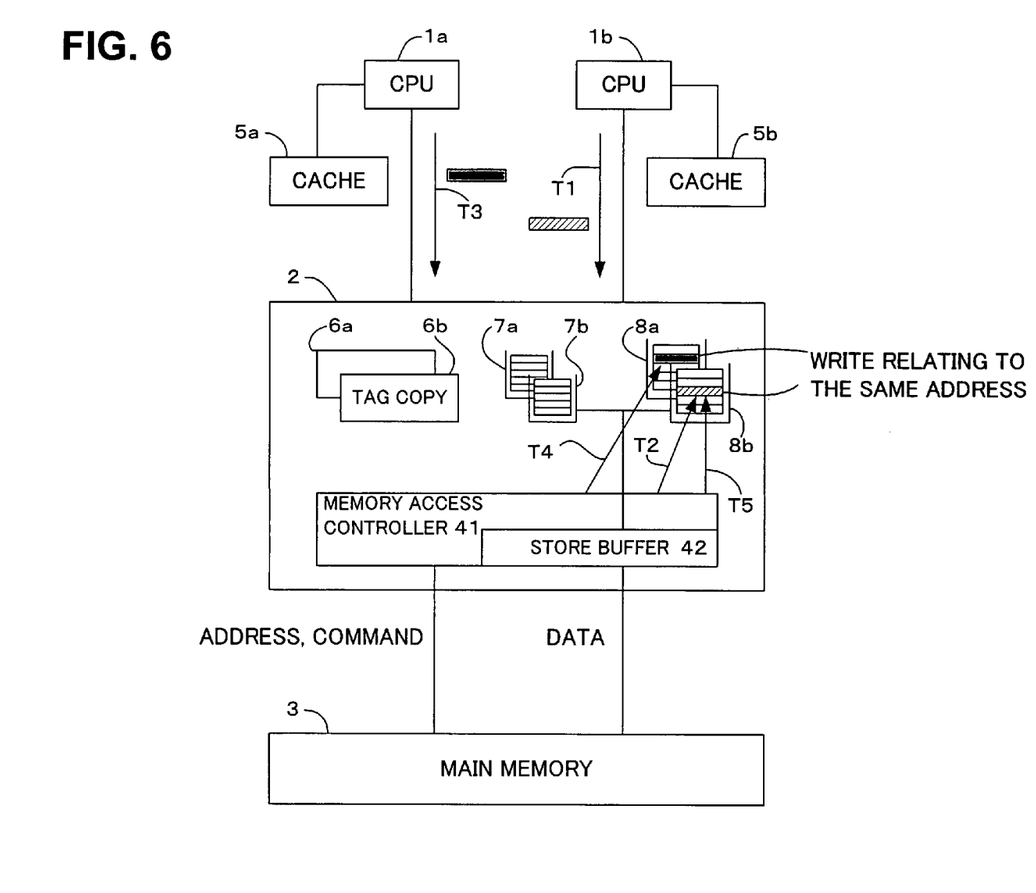
FIG. 6 is a view that explains an operation (No.3) of the information processing device according to an embodiment of the present invention.

FIG. 6 illustrates the operation (third example) of the information processing device of the present embodiment. First, a write request relating to a certain address is inputted from the CPU 1b into the system controller 2 (T1). Having received the write request, the memory access controller 41 stores the write request in the write cue 8b corresponding to the CPU 1b (T2).

Then a write request relating to the same address is inputted from the CPU 1a to the system controller 2 (T3). Having received the write request, the memory access controller 41, stores the write request in the write cue 8a corresponding to the CPU 1a (T4).

Further, when the write request relating to the same address is stored in the write cue 8a, the memory access controller 41 cancels the preceding write request relating to the same address that is to be stored in the write cure 8b (T5). The processing shown in FIG. 6 is implemented in combination with the processing shown in FIG. 4 and FIG. 5.

Thus, the effect obtained is that the control for maintaining consistency (memory consistency, cache coherence) is facilitated without the presence of a plurality of superimposed write data in a plurality of system controllers 21, 22. In this case, too, no problems are associated with the control because the subsequent (newest) request remains in the write cue.

With the above-described embodiment, data is transmitted from the write cue and the degradation of processing efficiency of the information processing device is prevented without waiting for the arbitration relating to the store buffer, even when a read request relating to the same address is generated, while the system controller 2 holds the write data to be written into the main memory 3. Another effect is that the control for maintaining consistency (memory consistency, cache coherence) is facilitated without the presence of a plurality of superimposed write data in a plurality of system controllers.

What is claimed is:

1. An information processing device, comprising:
a plurality of processing units;
a plurality of cache memories corresponding to said plurality of processing units, storing temporarily data read by said plurality of processing units from a main memory in combination with tag information indicating a state of said data that will be stored; and
a system controller for controlling the access of said plurality of processing units to said main memory, comprising;
a tag copy unit holding a copy of the tag information that will be stored in said cache memories, a plurality of write cues, corresponding to said plurality of processing units, storing write requests outputted respectively by said plurality of processing units, and a store buffer storing the arbitration results relating to a plurality of write requests that will be stored in said plurality of write cues, and
said system controller, in the case where said tag information contained in said cache memories and said tag information contained in said tag copy unit are asynchronous when a read request from one processing unit of said plurality of processing units is inputted, searches said plurality of write cues to find whether a write request relating to the address corresponding to said read request has been inputted by another processing unit that is different from said one processing unit and, when determining that a request has been inputted in any of said plurality of write cues, updates the main memory using the data contained in the write request from the write cue inputting the write request relating to the address corresponding to said read request to the one processing unit without waiting for the arbitration relating to the store buffer.

2. The information processing device according to claim 1, wherein:
said system controller cancels said write request relating to the address corresponding to said read request.

3. The information processing device according to claim 1, wherein:
said plurality of processors is divided into a plurality of groups;
said system controller is present for each said group; and
a first system controller corresponding to one group of said plurality of groups, in the case where said tag information contained in a cache memory of said first system controller and said tag information contained in a tag copy unit of said first system controller are asynchronous when a read reference request from a second system controller different from the first system controller is inputted, searches said plurality of write cues provided in said first system controller to find whether a write request, relating to the address corresponding to said read reference request, has been inputted and, when determining that a request has been inputted in any of said plurality of write cues, acknowledges the data contained in said corresponding write request.

4. The information processing device according to claim 3, wherein:
said first system controller cancels said write request relating to the address corresponding to said read request.

5. The information processing device according to claim 4, wherein:
said second system controller adds, to the write cue of said second system controller, a write request to write data acknowledged in response to said read reference request in the address corresponding to said read reference request.

6. The information processing device according to claim 1, wherein:
said system controller, when there follows a separate write request to the address corresponding to any write request contained in said plurality of write cues, cancels said write request that preceded the separate write request.

7. A data control method in an information processing device having a plurality of processing units, a plurality of cache memories corresponding to said plurality of processing units, storing temporarily data read by said plurality of processing units from a main memory in combination with first tag information indicating the state of said data that will be stored, and a system controller controlling the access of said plurality of processing units to said main memory, wherein said system controller comprises a tag copy unit holding second tag information, comprising a copy of the tag information that will be stored in said cache memories, a plurality of write cues, corresponding to said plurality of processing units, storing write requests outputted respectively by said plurality of processing units, and a store buffer storing the arbitration results relating to a plurality of write requests that will be stored in said plurality of write cues, the data control method comprising:
verifying whether said tag information stored in said cache memories and said copy of the tag information contained in said tag copy unit are asynchronous when a read request from one processing unit of said plurality of processing units is inputted;
searching said plurality of write cues to find whether a write request relating to the address corresponding to said read request has been inputted by another processing unit that is different from said one processing unit, when said first and second tag information are asynchronous; and
updating the main memory using the data contained in the write request from the write cue inputting the write request relating to the address corresponding to said read request to the one processing unit without waiting for the arbitration relating to the store buffer, when determining that the write request relating to the address corresponding to said read request has been inputted in any of said plurality of write cues.

8. The data control method according to claim 7, further comprising canceling said write request relating to the address corresponding to said read request.

9. The data control method according to claim 7, wherein said plurality of processors are divided into a plurality of groups and said system controller is present for each said group further comprising:

verifying whether said first tag information contained in a cache memory of said first system controller and said second tag information contained in a tag copy unit of said first system controller are asynchronous when a read reference request from a second system controller, which is different from the first system controller corresponding to one group of said plurality of groups, is inputted;

searching said plurality of write cues provided in said first system controller to determine whether a write request relating to the address corresponding to said read reference request has been inputted, when said first and second tag information are asynchronous; and acknowledging the data contained in said corresponding write request to the one processor, when determining that a write request relating to the address corresponding to said read reference request has been inputted in any of said plurality of write cues.

10. The data control method according to claim 9, further comprising canceling the write request relating to the address corresponding to said read reference request from said write cue of said first system controller.

11. The data control method according to claim 10, further comprising adding to the write cue of said second system controller a write request for writing data acknowledged in response to said read reference request in the address corresponding to said read reference request.

12. The data control method according to claim 7, further comprising, when there follows a separate write request to the address corresponding to any write request contained in said plurality of write cues, canceling said write request that preceded the separate write request.

13. A data control method of an information processing device, comprising:

storing data read by a plurality of processing units from a main memory in combination with tag information indicating a state of said data to be stored, said plurality of processing units corresponding to cache memories;

maintaining a copy of the tag information that will be stored in said cache memories, a plurality of write cues that correspond to said plurality of processing units;

storing, in a store buffer, arbitration results of a plurality of write requests to be stored in the plurality of write cues, wherein the store buffer is located between the plurality of write cues and said main memory;

searching the plurality of write cues to determine whether a write request relating to an address corresponding to a read request is previously stored;

transmitting write data directly from the write cues to update said main memory read out waiting for arbitration in relation to the store buffer in response to said searching indicating that the read request relates to the address in any of said plurality of write cues; and transmitting write data to update said main memory only after waiting for arbitration in relation to the store buffer in response to said searching indicating that the read request does not relate to the address in any of said plurality of write cues.

* * * * *